Aug. 11, 1953 — A. E. USHAKOFF — 2,648,079
APPARATUS FOR MOLDING SKINS
Filed Oct. 11, 1952 — 2 Sheets-Sheet 1

INVENTOR.
ALEXIS E. USHAKOFF
BY
ATTORNEYS

Aug. 11, 1953     A. E. USHAKOFF     2,648,079
APPARATUS FOR MOLDING SKINS

Filed Oct. 11, 1952     2 Sheets-Sheet 2

*INVENTOR.*
ALEXIS E. USHAKOFF

BY

ATTORNEYS

Patented Aug. 11, 1953

2,648,079

UNITED STATES PATENT OFFICE 2,648,079

APPARATUS FOR MOLDING SKINS

Alexis E. Ushakoff, Beverly, Mass., assignor to Secotan, Inc., Cambridge, Mass., a corporation of Massachusetts Application October 11, 1952, Serial No. 314,281

18 Claims. (Cl. 12—97)

The present invention relates to the manufacture of molded leather articles and consists in apparatus for molding skins by conforming them while plastic to the contours of a concave molding surface under the pressure of a fluid, including apparatus disclosed in my U. S. Patent 2,582,298 and improvements thereto.

Processes for molding shaped leather articles, such as shoe uppers and the like, in which apparatus of this invention is particularly useful, are disclosed in my U. S. Patent 2,582,298 and in my copending patent application Ser. No. 233,923, filed June 27, 1951, of which the present application is a continuation in part. In those processes a water-wet skin which is sufficiently plastic to be molded is conformed to a concave mold surface by fluid pressure and one or more fluids for treating the skin is forced through it while it is so conformed to the mold surface.

For carrying out such processes the present invention provides apparatus wherein a skin may be positioned with its central region unconfined opposite the concave mold surface and its marginal edges clamped around the mold surface, a fluid pressure then applied across the skin to conform it to the mold surface and a treating fluid then forced through the skin. Preferred embodiments provide an improved support for the mold shell which substantially eliminates all tensional or bending stresses from the shell during the application of fluid pressures to the skin in its processing, thus making possible the use of thinner and more pervious shells.

In general the apparatus of this invention includes in suitable supporting structure a porous shell having a concave mold surface, a rim surrounding the outer edge of the mold surface and clamping structure cooperating with the rim for securing the marginal edges of a blank of skin to be molded with its central region unconfined opposite the mold surface. A conduit is provided at the side of the skin facing away from the mold surface, to deliver treating fluids to the skin, and means including a second conduit are preferably provided at the outside of the mold shell for collecting and draining off fluids that have been passed through the skin. The fluid pressure to conform the skin to the mold surface may be a positive pressure applied to the surface of the skin facing away from the mold surface, or a vacuum applied from outside the mold, and may accordingly be applied through either of the two conduits or separate conduits similarly situated. To allow the application of such a pressure, enclosing structure extending between at least one of the conduits and the skin at the edge of the mold is provided. Conveniently, the enclosing structure consists of a housing for the mold shell, and a cooperative cover, the edges of which comprise respectively the rim surrounding the mold surface and the cooperating clamping structure.

The porous mold shell may consist of any of a number of porous, more or less rigid, and frequently brittle, materials through which fluids will readily flow including plaster of Paris, unglazed porcelain, sintered glass and other ceramic materials, and it may be supported directly against the housing or on a bed of particulate material, such as sand. Because of its porosity the skin may be forced into close conformity to the mold surface without the entrapment of air between the skin and the mold, and fluids under pressure may readily be forced through the skin while it is in the mold. Pressures applied to the skin are transmitted to the mold shell and may cause it to crack if it is brittle and not rigidly supported. The mold shell may be thus supported directly against solid accommodating structure within the housing, but such shells must conform accurately to the shape and dimensions of the supporting structure.

A preferred method of supporting brittle mold shells which does not impose any critical dimensional limitations on the shell or supporting structure consists in supporting the shell on a flexible membrane to the other side of which is applied a fluid pressure equal to that applied to the skin. This is most conveniently provided by enclosing a fixed volume of liquid in the housing by a flexible membrane covering on which the mold is supported. Any pressure applied to the skin above the mold creates substantially the same fluid pressure in the enclosed liquid, thus subjecting the mold throughout solely to compressional forces.

This invention will best be understood from the following detailed description of preferred embodiments selected for purposes of illustration, and shown in the accompanying drawings in which.

Figure 1:
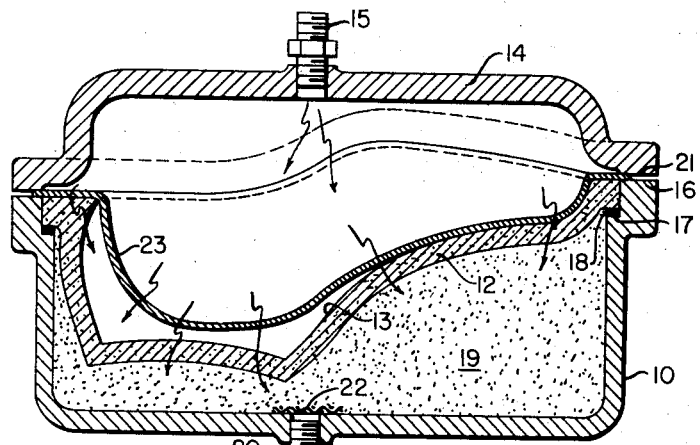
Fig. 1 is a cross sectional view in longitudinal elevation showing molding apparatus of this invention with a skin partly molded therein.
Figure 2:
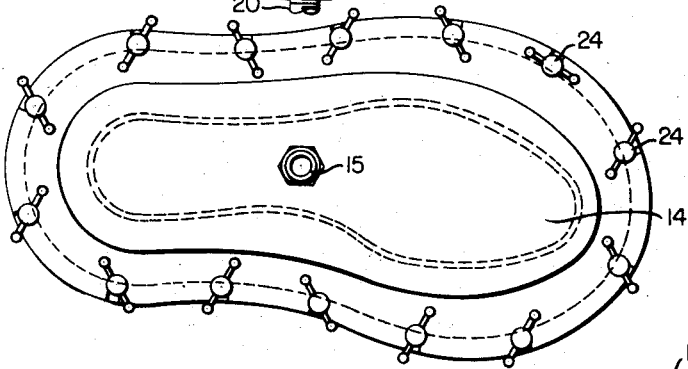
Fig. 2 is a plan view of the apparatus shown in Fig. 1.
Figure 3:
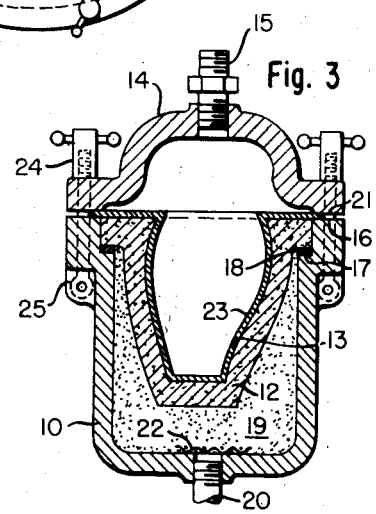
Fig. 3 is a cross sectional view in transverse elevation of apparatus shown in Fig. 1.

One form of apparatus suitable for the molding of shoe uppers is shown in Figs. 1, 2 and 3, and consists of a supporting box-like housing 10 containing the mold shell 12 and provided with a cooperating cover 14 having a fluid inlet tap 15. The mold shell 12 has a concave inner mold surface 13 which accurately conforms to the shape and dimensions of the shoe upper to be molded therein, and is supported at its marginal edge on a recessed peripheral shoulder 17 in the housing 10 through a soft cushioning gasket 18, with its central region resting on sand 19 contained within the housing.

The upper edge of the housing 10 constitutes a peripheral rim 16 which surrounds the mold shell 12, and with which the mating surface 21 of a marginal flange on the cover cooperates in clamping the skin 23 in the mold. The cover is tightly clamped to the mold by a number of tubular nuts 24 which engage bolts 25 passing through the outer edges of the rim 16 on the housing and the marginal flange on the cover.

A drainage conduit 20 is tapped into the bottom of the housing 10 and is covered at its inner end by a screen 22.

A blank of a wet skin 23 may be molded in this apparatus by positioning it with its marginal edges overlying the rim 16 and clamping the cover 14 over it. A fluid pressure differential is then applied across the skin either by applying a fluid under pressure to the inlet tap 15, or by applying a suction at the drainage conduit 20, or both, to force the unconfined central area of the skin into conformity with the mold surface 13, as suggested by Fig. 1. Thereafter, fluids with which it is desired to treat the skin, for instance acetone to dehydrate it, or tanning solutions, are introduced onto the molded skin through inlet tap 15, and forced through the skin and the mold either under their own positive pressure or by a vacuum applied to the drainage conduit 20. Reference is made to my Patent 2,582,298 and copending application Ser. No. 233,923, filed June 27, 1951, for further details pertaining to fluid treatment.

Figure 4:
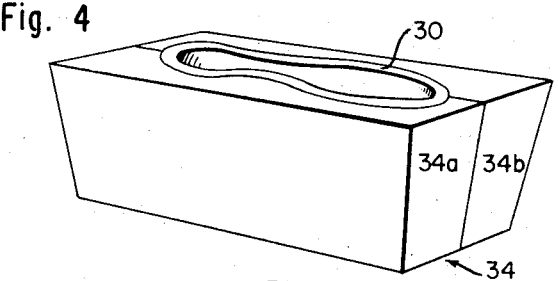
Fig. 4 is a perspective view of a mold and solid supporting structure therefor.
Figure 5:
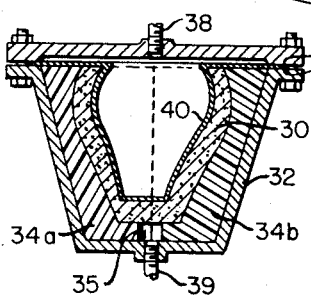
Fig. 5 is a cross sectional view in transverse elevation of apparatus shown in Fig. 4 embodied in apparatus of this invention.

In a modified construction of the molding apparatus, shown in Figs. 4 and 5, the mold shell 30 is supported within the housing 32 in a solid block 34 recessed at the top side to accommodate the shell and support it uniformly about its entire outer surface. The supporting block 34 is conveniently split into abutting pieces 34a and 34b which may be engaged around the shell notwithstanding any reentrant configuration it may have. The block 34 is snugly received in the housing 32 which supports it and holds the two sections together with the shell contained between them. The top of the block 34 roughly alines with the edge of the housing which is flanged to provide a rim 36. A cover having a cooperating mating surface 37 at its edge is clamped over the housing and mold with the skin 40 overlying the mold surface and secured at its marginal edge between the rim 36 and cooperating mating surface 37.

Fluids are introduced to a skin situated over the mold by an inlet tap 38 situated in the cover, and are removed through a drainage tap 39 situated in the bottom of the housing. Communicating between the mold shell and the drainage tap is a channel 35 formed in the block 34, preferably extending to the low point in the recessed region accommodating the shell.

In the type of construction shown in Figs. 4 and 5, the mold is rigidly supported about its entire outer surface, thus greatly reducing any tendency it may have to crack under the stress of the applied fluid pressure. It has been found that with porous ceramic molds, although the fluid drain channel 15 connects with the mold at only one point, drainage through the skin is substantially uniform over its surface. Apparently, drainage through the walls of the mold is sufficiently free that the mold shell itself is a sufficient pressure-equalizing manifold.

A disadvantage of this construction is inherent from the necessity of the outer surface of the mold shell to conform accurately to the supporting recessed surface in the supporting block. Conveniently, the mold shell is cast directly in the supporting block to assure accurate conformation.

Figure 6:
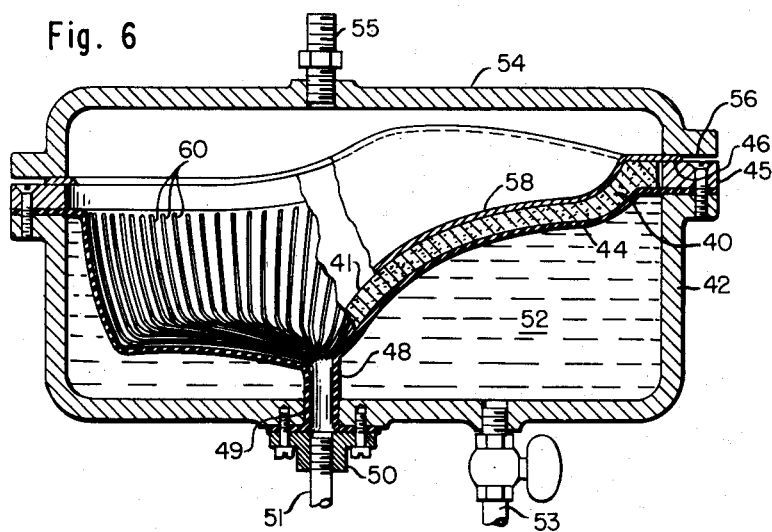
Fig. 6 is a cross sectional view in longitudinal elevation showing a modified embodiment of this invention.

A further modification of the molding apparatus of this invention particularly suitable for use with brittle mold shells in eliminating tensional and torsional stresses in the shell is shown in Fig. 6. In this preferred construction the mold shell 40 having a concave inner molding surface 41 is supported within the housing 42 on a flexible dished membrane 44 that generally, but not necessarily accurately, conforms to the shape and dimensions of the outside surface of the mold shell. The outer edge of the membrane 44 is tightly secured between the upper edge of the housing 42 and an overlying rim member 45 having a flat top rim surface 46, and a tubular extension 48 joins with the membrane at about the low point and passes through a hole 49 in the bottom of the housing about the edges of which the outwardly flared end of the extension is tightly secured by a flanged coupling 50 through which the extension communicates with a drainage conduit 51. The volume in the housing enclosed by membrane supporting the mold shell is filled with a liquid 52 which serves to support the mold shell on the membrane, and which may be introduced or removed through a cock 53 provided in the bottom of the housing.

A cover 54, provided with an inlet tap 55, and having a marginal edge 56 that cooperates with the rim surface 46 in securing the marginal edges of the skin 58 around the edge of the mold, is secured over the housing and mold shell assembly by conventional means.

With the wet skin 58 secured in position between the housing 42 and cover 54, a fluid pressure differential may be applied across it, either by applying fluid under pressure through the inlet tap 55 or by drawing a vacuum at the drainage conduit 51. The pressure of the skin 58 against the mold shell 40 results in an equal pressure against the membrane 44. The fluid 52 enclosed within the housing uniformly opposes any pressure exerted by the membrane and provides uniform support for the membrane and the mold shell situated on it. The mold thus floats within the housing and is subjected solely to compressional forces. Because the membrane is flexible it is free to assume the conformation of the outside supporting surface of the mold shell to provide the desired uniform supporting pressure.

The membrane 44 may consist of any flexible impervious sheet material, which is also preferably somewhat elastic including rubber, synthetic rubber, polyethylene, plasticized flexible vinyl polymers and similar materials.

Figure 7:
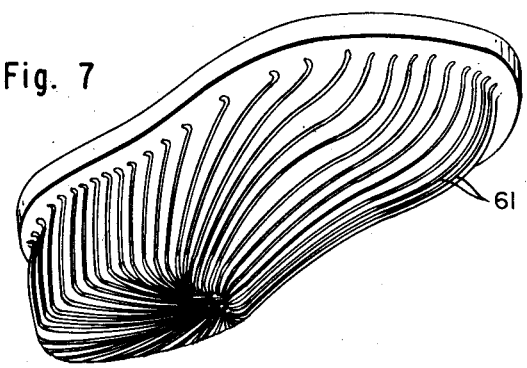
Fig. 7 is a bottom perspective view of a mold shell which may be used in the embodiment of this invention shown in Fig. 6.
Figures 8, 9:
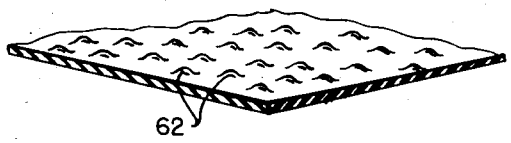
Fig. 8 is a view of a section of a membrane suitable for use in the apparatus shown in Fig. 6.
Fig. 9 is a view of a section showing in part a membrane, mold shell, and intermediate supporting structure adapted for use in the apparatus shown in Fig. 6.

If the outer mold shell surface nad the membrane surface are both smooth, and contact between them is continuous, the drainage of fluids through the skin and mold to the tubular extension 48 must occur entirely within the wall of the shell and is thus somewhat restricted, although drainage of this sort is relied on in the apparatus shown in Figs. 4 and 5, and is satisfactory. Drainage of fluids through the shell is greatly improved if a drainage region is provided between the shell and the membrane. For this purpose, the membrane surface may be provided with closely spaced ridges 60 forming drainage channels leading to the tubular extension 48, as shown in Fig. 6, or the outer surface of the mold may be formed with ridges 61 as suggested by Fig. 7. Alternatively, the membrane surface may be formed with closely spaced bumps 62 as suggested by Fig. 8 or as indicated in Fig. 9 a loose porous supporting sheet 64, for instance of felt or wire mesh, may be positioned between the membrane 44 and the mold shell 40 to support the shell and provide drainage from its outer surface.

It will be seen that this latter modification of this invention provides uniform distribution of the shell supporting forces, and by eliminating all rigid support for the shell there is a substantial absence of all tensional or torsional stresses within the shell. Multipoint or channeling contact providing drainage between the mold shell and the membrane may nevertheless be present.

By molding a skin on a concave molding surface, as by apparatus described above, the skin is conformed to the mold by an absolute minimum of planar tensional forces. Once the skin is forced against the mold, additional pressure exerts compressional forces against the skin without any tendency to stretch the skin further. Moreover, curved surfaces become thickened by such molding processes and are thus strengthened. On the other hand, a skin molded on a convex mold, such as a last, may easily be stretched more than necessary to conform the skin to the mold, and at curved surfaces the skin becomes thinner.

Further advantages derived from molding a skin to a concave surface include the rapidity with which the skin may be tanned, and access to the interior surface while the skin is on the mold, thus making possible the application of stiffening materials or other treatment of the interior surface.

Although the processes of molding skin to concave molding surfaces may be carried out in several different kinds of apparatus, those provided by the present invention will be seen to be particularly useful for such processes in providing for proper positioning and securing of the skin, application of fluid pressure and permeation by treating fluids.

The present invention has been described in detail with reference to the manufacture of molded shoe uppers, but it will be understood that it is not limited to such manufactures and may be used for the production of other molded leather articles. Moreover, it is contemplated that numerous structural modifications in the embodiments described above will readily occur to those skilled in the art, and may be made without departing from the scope of this invention.

Having thus disclosed my invention and described in detail those embodiments which I now consider best for its practice, I claim and desire to secure by Letters Patent:

1. Apparatus for molding skins and the like and treating them with fluids comprising a porous shell having a concave mold surface, a rim surrounding the mold surface and clamping means cooperative therewith for securing the marginal edges of a skin with its unconfined area overlying the mold surface, first conduit means for delivering treating fluids above the skin, second conduit means for draining fluids from beneath the mold, and enclosing means extending between the skin at the edge of the molding surface and at least one of said conduit means whereby a fluid pressure differential may be applied across the skin to conform it to the mold and force fluids through it and the mold.

2. Apparatus for molding skins and the like and treating them with fluids comprising a porous shell having a concave mold surface, a supporting housing for said shell and a cover therefor, said housing and said cover having cooperating mating edge surfaces adapted to clamp between them a skin with its unconfined central area overlying the mold, conduit means in said cover for delivering a treating fluid to the skin, and conduit means in said housing for draining fluids from beneath the mold.

3. Apparatus for molding skins and the like and treating them with fluids comprising a porous shell having a concave molding surface, an open-topped housing supporting said shell with the outer edges of the mold surface lying generally in the plane of the open top, a cover having edges cooperating with the top edges of said housing whereby a skin may be clamped between said cover and said housing with its unconfined central area overlying the mold surface, conduit means in said cover for delivering a fluid over the skin, and conduit means in said housing for draining fluids from beneath the mold.

4. Apparatus defined by claim 3 wherein the mold is supported at its outer surfaces on a bed of particulate material in the housing.

5. Apparatus defined by claim 3 wherein the mold is supported at its outer surface on a solid rigid surface within said housing accurately conforming to the outer surface of the mold and having a drainage tap communicating with the conduit means in the housing.

6. Apparatus for molding skins and the like and treating them with fluids comprising an open-topped housing enclosed by a flexible membrane having a drainage conduit extending through said housing, a porous shell having a concave mold surface supported on its outer surface by multipoint channeling contact with said membrane, a fluid enclosed within said housing by said membrane providing a medium supporting said membrane and said shell, a rim surrounding the mold surface and clamping means cooperating therewith for securing a skin with its unconfined central region overlying the mold, and conduit means for delivering a treating fluid above said skin.

7. Apparatus for molding skins and the like and treating them with fluids comprising an open-topped housing enclosed by a flexible membrane having a drainage conduit extending through said housing, a porous shell having a concave mold surface supported on its outer surface by multipoint channeling contact with said membrane, a fluid enclosed within said housing by said membrane providing a medium supporting said membrane and said shell, a rim surface integral with said housing and surrounding the mold surface, and a cover for said housing having an edge surface cooperative with the said flange for clamping a skin with its central region unconfined over the mold, and a conduit in said cover for delivering treating fluids to said skin.

8. Apparatus for molding skins and the like and treating them with fluids comprising an open-topped housing enclosed by a flexible membrane having a drainage conduit extending through said housing, a porous shell having a concave mold surface supported on its outer surface by said membrane, a fluid enclosed within said housing by said membrane providing a medium supporting said membrane and said shell, a rim surrounding the mold surface and clamping means cooperating therewith for securing a skin with its unconfined central region overlying the mold, and conduit means for delivering a treating fluid above said skin.

9. Apparatus for molding skins and the like and treating them with fluids comprising an open-topped housing enclosed by a flexible membrane having a drainage conduit extending through said housing, a porous shell having a concave mold surface supported on its outer surface by said membrane, a fluid enclosed within said housing by said membrane providing a medium supporting said membrane and said shell, a rim surface integral with said housing and surrounding the mold surface, and a cover for said housing having an edge surface cooperative with the said flange for clamping a skin with its central region unconfined over the mold, and a conduit in said cover for delivering treating fluids to said skin.

10. Apparatus for molding skins into shoe uppers and the like and treating them with fluids comprising a porous shell having a concave last-shaped mold surface, a rim surrounding the mold surface and clamping means cooperative therewith for securing the marginal edges of a skin with its unconfined area overlying the mold surface, first conduit means for delivering treating fluids above the skin, second conduit means for draining fluids from beneath the mold, and enclosing means extending between the skin at the edge of the molding surface and at least one of said conduit means whereby a fluid pressure differential may be applied across the skin to conform it to the mold and force fluids through it and the mold.

11. Apparatus for molding skins into shoe uppers and the like and treating them with fluids comprising a porous shell having a concave last-shaped mold surface, a supporting housing for said shell and a cover therefor, said housing and said cover having cooperating mating edge surfaces adapted to clamp between them a skin with its unconfined central area overlying the mold, conduit means in said cover for delivering a treating fluid to the skin, and conduit means in said housing for draining fluids from beneath the mold.

12. Apparatus for molding skins into shoe uppers and the like and treating them with fluids comprising a porous shell having a concave last-shaped molding surface, an open-topped housing supporting said shell with the outer edges of the mold surface lying generally in the plane of the open top, a cover having edges cooperating with the top edges of said housing whereby a skin may be clamped between said cover and said housing with its unconfined central area overlying the mold surface, conduit means in said cover for delivering a fluid over the skin, and conduit means in said housing for draining fluids from beneath the mold.

13. Apparatus defined by claim 12 wherein the mold is supported at its outer surfaces on a bed of particulate material in the housing.

14. Apparatus defined by claim 12 wherein the mold is supported at its outer surface on a solid rigid surface within said housing accurately conforming to the outer surface of the mold and having a drainage tap communicating with the conduit means in the housing.

15. Apparatus for molding skins into shoe uppers and the like and treating them with fluids comprising an open-topped housing enclosed by a flexible membrane having a drainage conduit extending through said housing, a porous shell having a concave last-shaped mold surface supported on its outer surface by multipoint channeling contact with said membrane, a fluid enclosed within said housing by said membrane providing a medium supporting said membrane and said shell, a rim surrounding the mold surface and clamping means cooperating therewith for securing a skin with its unconfined central region overlying the mold, and conduit means for delivering a treating fluid above said skin.

16. Apparatus for molding skins into shoe uppers and the like and treating them with fluids comprising an open-topped housing enclosed by a flexible membrane having a drainage conduit extending through said housing, a porous shell having a concave last-shaped mold surface supported on its outer surface by multi-point channeling contact with said membrane, a fluid enclosed within said housing by said membrane providing a medium supporting said membrane and said shell, a rim surface integral with said housing and surrounding the mold surface, and a cover for said housing having an edge surface cooperative with the said flange for clamping a skin with its central region unconfined over the mold, and a conduit in said cover for delivering treating fluids to said skin.

17. Apparatus for molding skins into shoe uppers and the like and treating them with fluids comprising an open-topped housing enclosed by a flexible membrane having a drainage conduit extending through said housing, a porous shell having a concave last-shaped mold surface supported on its outer surface by said membrane, a fluid enclosed within said housing by said membrane providing a medium supporting said membrane and said shell, a rim surrounding the mold surface and clamping means cooperating therewith for securing a skin with its unconfined central region overlying the mold, and conduit means for delivering a treating fluid above said skin.

18. Apparatus for molding skins into shoe uppers and the like and treating them with fluids comprising an open-topped housing enclosed by a flexible membrane having a drainage conduit extending through said housing, a porous shell having a concave last-shaped mold surface supported on its outer surface by said membrane, a fluid enclosed within said housing by said membrane providing a medium supporting said membrane and said shell, a rim surface integral with said housing and surrounding the mold surface, and a cover for said housing having an edge surface cooperative with the said flange for clamping a skin with its central region unconfined over the mold, and a conduit in said cover for delivering treating fluids to said skin.

ALEXIS E. USHAKOFF.

No references cited.